United States Patent
Øhrn

(10) Patent No.: US 6,356,874 B1
(45) Date of Patent: *Mar. 12, 2002

(54) COMPUTER-BASED METHOD AND SYSTEM FOR ORDERING SERVICES

(75) Inventor: Harald Øhrn, Kristiansand (NO)

(73) Assignee: Bellboy International A/S, Kristiansand (NO)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/663,055
(22) PCT Filed: Dec. 16, 1994
(86) PCT No.: PCT/NO94/00206
    § 371 Date: Jun. 14, 1996
    § 102(e) Date: Jun. 14, 1996
(87) PCT Pub. No.: WO95/17733
    PCT Pub. Date: Jun. 29, 1995

(30) Foreign Application Priority Data

Dec. 17, 1993 (NO) .............................................. 934696

(51) Int. Cl.⁷ .............................................. G06F 17/60
(52) U.S. Cl. .............................. 705/6; 705/5; 705/26; 705/28
(58) Field of Search .................. 705/26–28, 5, 705/6

(56) References Cited

U.S. PATENT DOCUMENTS

| | | | |
|---|---|---|---|
| 4,720,849 A | 1/1988 | Tayama | 379/90 |
| 4,788,643 A | 11/1988 | Trippe et al. | 364/407 |
| 4,799,156 A | * 1/1989 | Shavit et al. | |
| 4,870,576 A | * 9/1989 | Tornetta | 364/401 |

(List continued on next page.)

FOREIGN PATENT DOCUMENTS

| | | | | |
|---|---|---|---|---|
| CA | 1281417 C | * | 3/1991 | G06F/17/60 |
| DE | 40 19 890 | | 1/1992 | G06F/15/24 |
| EP | 446500 | | 9/1991 | G06F/15/24 |
| EP | 455825 | | 11/1991 | G06F/15/26 |
| GB | 2207838 | | 2/1989 | H04M/11/08 |
| SE | 9102930-6 | | 4/1993 | H04M/11/08 |
| WO | 1989-046305 | * | 1/1989 | G06F/15/21 |
| WO | 1991-185420 | * | 6/1991 | G06F/15/26 |

OTHER PUBLICATIONS

C. Borzillo, Computer users to test online ticket buying, Billboard, pp. 21, Oct. 30, 1993.*

(List continued on next page.)

*Primary Examiner*—Cuong H. Nguyen
(74) *Attorney, Agent, or Firm*—Birch, Stewart, Kolasch & Birch, LLP

(57) ABSTRACT

In a method of ordering services, like booking hotel rooms, the ordering is performed via a user terminal connected to a central data processing device. A service request is specified and information of a service is retrieved from a data base in the central data processing device. When a given service offer is selected, a connection is automatically established between the user terminal and a service location terminal via the central data processing device, whereupon the desired service can be ordered and the order confirmed. Further orders can be placed before the connection is broken. When an order has been made, the data base is automatically updated from the service location. A system is also specified for implementing the method. In a telemarketing system, a suitable user terminal may be a touch-tone telephone. The user terminal may also be a dedicated terminal with software for specifying the order.

26 Claims, 7 Drawing Sheets

U.S. PATENT DOCUMENTS

| | | | | |
|---|---|---|---|---|
| 4,984,155 | A | | 1/1991 | Geier et al. |
| 4,992,940 | A | | 2/1991 | Dworkin ..................... 364/401 |
| 5,008,930 | A | | 4/1991 | Gawrys et al. |
| 5,021,953 | A | * | 6/1991 | Webber et al. ................. 705/6 |
| 5,214,689 | A | | 5/1993 | O'Sullivan |
| 5,237,499 | A | | 8/1993 | Garback ..................... 364/407 |
| 5,239,480 | A | | 8/1993 | Huegel ....................... 364/479 |
| 5,253,165 | A | | 10/1993 | Leiseca et al. .............. 364/407 |
| 5,253,166 | A | * | 10/1993 | Dettelbach et al. ............ 705/5 |
| 5,331,546 | A | * | 7/1994 | Webber et al. ................. 705/6 |
| 5,345,501 | A | * | 9/1994 | Shelton ........................ 379/89 |
| 5,408,417 | A | * | 4/1995 | Wilder ........................... 705/5 |
| 5,524,137 | A | * | 6/1996 | Rhee ............................ 379/67 |
| 5,576,951 | A | * | 11/1996 | Lockwood ................... 705/27 |
| 5,870,721 | A | * | 2/1999 | Norris ......................... 705/38 |

OTHER PUBLICATIONS

R. Fairlie, Rosenbluth acquires travelmation auditing firm, Travel Weekly, vol. 51, No. 96, pp. 35–36.*

C. Rosen, Reservation revolution: travel angencies attempt to develop a new reservation system, Business Travel News, pp. 1, May 10, 1993.*

J. O'Brien, Chicago online teams up with Ticketmaster to sell Chicago Cubs tickets, Computer Shopper, vol. 13, No. 5, pp. 71,May 1993.*

B. Sturken, "Technically Speaking. (Rosenbluth Travel Agency Inc.'s In–House Automation System)," Travel Weekly, vol. 51, No. 13, pp. S27–S28, Feb. 1992.*

The International Telegraph and Telephone Consultative Committee (CCITT) Recommendation, "Principles of Intelligent Network Architecture", Recommendation I.312/Q.1201, Oct. 1992, pp. 1–33.

Telecommunication Standardization Sector of ITU Recommendation, "Introduction to Intelligent Network Capability Set 1", Recommendation Q.1211, Mar. 1993, pp. 1–30.

Telecommunication Standardization Sector of ITU Recommendation, "Global Functional Plane for Intelligent Network CS–1", Recommendation Q.1213, Mar. 1993, pp. 1–33.

Telecommunication Standardization Sector of ITU Recommendation, "Intelligent Network User's Guide for Capability Set 1", Recommendation Q.1219, Apr. 1994, pp. 1–204.

Telecommunication Standardization Sector of ITU Recommendation, "Distributed Functional Plane for Intelligent Network CS–1", Recommendation Q.1214, Mar. 1993, pp. 1–224.

Skolt, Endre, "Introduction to Intelligent Networks", publication from the Office for Technical Training in Televerket for the course "50001A Telecommunication for Planners", May 6, 1991, pp. 1–57.

* cited by examiner

Welcome to BELLBOY BOOKING SYSTEMS.
Select function with the arrow keys.

HOTEL BOOKING
    AIRLINE, TRAIN, BOAT AND BUS BOOKING
    FIND NAME, ADDRESS AND TELEPHONE NUMBER
    STORE NAME, ADDRESS AND TELEPHONE NUMBER
    DELETE FILES.

*Fig. 3*

You have chosen to call from France in order to book a hotel room in Kristiansand in Norway.
Key in the period for which you wish to book the room.
ARRIVAL:      year__ month__ day__
DEPARTURE: year__ month__ day__

Set upper price limit by moving the arrow with the arrow keys:
    NOK 400,-
    NOK 600,-
    NOK 800,-
    NO PRICE LIMIT Key " * " in order to make more booking arrangements.
Key " C " in order to clarify the ringing procedure.

*Fig. 10*

Lift the telephone receiver and wait for the dialling tone.
Place the loudspeaker on the pocket computer against the microphone on the telephone receiver and key " C ".

Wait until contact is established and key " S ".

When the line above has stopped blinking, the suitable hotels with vacant rooms will be read out by a voice network interface in the " BELLBOY BOOKING SYSTEM ".

*Fig. 11*

COMPUTER-BASED METHOD AND SYSTEM FOR ORDERING SERVICES

BACKGROUND OF THE INVENTION

The invention concerns a method for ordering services, especially for booking hotel rooms and travel at home and abroad as well as medical services, wherein the ordering is performed via a user terminal connected to a central data processing device, wherein the central data processing device comprises a data storage device and is also connected to a service location terminal and wherein the method comprises steps for:

a) calling up the central data processing device from the user terminal, b) specifying a service request to the central data processing device, c) retrieving information on the service offer from a data base in the central data processing device, d) selecting a service offer on the basis of the retrieved information from the data base. The invention also concerns a system for ordering services, especially for booking hotel rooms and travel at home and abroad together with medical services where the ordering is undertaken via a user terminal connected with at least one central data processing device, wherein the central data processing device comprises a data storage device and is also connected to a service location terminal.

The combination of modern computer-based information systems and telecommunication systems makes it possible to order services from a local subscriber's terminal which is connected to the computer-based information system. The permanent service offer can be entered in the computer-based information system and the customer selects the service on the basis of information received from the information system. Information systems of this kind can also pass on the customer's choice of service to the service location where the order is recorded and the service is executed.

In GB patent application no. 2 207 838, for example, there is disclosed a digital, interactive communication system where the subscribers can select by means of touch-tone telephones from a number of pre-recorded video presentations and products and services for sale. Subscriber requests are received by a voice network interface which is coupled to a local data network. Via the local data network a subscriber of a dedicated data processor is served in the local data network which is connected to a large data base which digitally stores video presentations which can be retrieved by the subscribers and displayed on their television receivers, the video presentations being transferred digitally to a second local data network which is connected to a cable network which supplies the information to the subscriber's television receiver.

In U.S. Pat. No. 4,720,849 there is disclosed a device for displaying information, the devices being installed in publicly accessible locations such as railway stations. The device comprises a display, for example in the form of a viewing screen, a keyboard and a telephone set. When the microtelephone is lifted during the display of a specific type of service information, for example hotel information, restaurant information, travel information, mail order information or job offers, a telephone circuit in the set will connect the user directly with the location from which the information comes.

In U.S. Pat. No. 4,788,643 there is disclosed information and booking data processing systems wherein cooperating and interconnecting computers handle information and booking for different kinds of travel reservations, particularly by using existing systems, namely an airline reservation system and remotely located terminals in travel agents' office, connected to separate cruise information computer, for also providing information and booking services specifically on cruises.

Further in U.S. Pat. No. 5,237,499 there is disclosed a computer-based system for handling travel requests aimed at a specific offer to individual members of a sponsored group. The system comprises a data base with information on the offer and the individual members of the group as well as information on pre-selected sellers of various travel services and a place code file with codes which correspond to the locations of airports in a number of towns. The information is displayed to an individual group member who is performing a travel request via a terminal such as a personal computer. A central processor communicates both with the data base and a number of computer-based ordering systems in airline companies. The central processor is programmed in such a manner that it can select the travel route for the group member on the basis of the given offer which comprises specific air routes and if necessary, hotel and car rental services.

Finally it has become increasingly common to use so-called telemarketing services in marketing capital goods and services, e.g. via the public telephone network. In this case both customer and seller can be connected with a data bank via the telephone network, information being retrieved from the data bank or entered in the data bank by means of modern touch-tone telephones. One method for implementing a telemarketing system of this kind is disclosed in Swedish patent application no. 9102930-6, where the method is based on the fact that the seller informs the customer of his existence by calling the data bank's telephone number and then describing his goods and services by means of coded numbers for building up the data bank via the telephone keys while at the same time the seller's telephone number is also entered. A customer can obtain information on goods and services, including the price of these from the seller by calling the data bank's telephone number.

SUMMARY OF THE INVENTION

The object of the present invention is to improve and increase the efficiency of the method for ordering services by means of central data bases and public telecommunication networks.

To be more specific, a first object is to permit the customer or user to specify a service request and to obtain information on services on the basis of the specified service request in order to subsequently perform a selection of the most suitable service offer. A second object of the invention is to cause the choice of service offer to effect a direct connection between the customer and the service location, thus enabling the ordering of the service to be implemented.

A third object is to maintain the connection between the user and the central data processing device after the customer's order has been confirmed, thus enabling the user to order further services without the necessity of calling up the central data processing device again.

A fourth object is that all orders which are effected lead to an automatic updating of the service offer which is stored in the central data processing device, a user thus being presented at all times with a reliable service offer.

A fifth object is that all orders can be made without any language problems being experienced in the communication between the user, the central data processing device and the service location when, e.g., communication takes place between different countries.

These above-mentioned and other objects are achieved with a method which is characterized in that it comprises the additional steps of e) having the choice of a service offer automatically effect the establishment of a connection between the user terminal and the service location terminal via the central data processing device,
f) ordering the desired service from the service location terminal,
g) transferring an order confirmation from the service location terminal to the user terminal, whereupon the established connection between the user terminal and the service location terminal is disconnected and the user terminal returns to the central data processing device in order either to specify a further service request or to terminate the call, the order being recorded in real time by a local data processing system at the service location and effecting a real time update of a data base in the local data processing system, while service information in the data base in the central data processing device is automatically and immediately updated from the local data processing system on the basis of the transactions undertaken between user terminal and service location terminal in connection with steps a)–g).

It is also an object of the invention to provide a system whereby the method according to the invention can be implemented by means of, amongst other things, existing data processing devices and telecommunication systems, including the possible use of existing telemarketing systems.

This last object is achieved according to the invention with a system which is characterized by a user terminal which is connected to the data processing device via a first, generally accessible telecommunication network, that the central data processing device is connected with the service location terminal via the said, first telecommunication network or a second telecommunication network, the service location terminal being connected with a data processing device at the service location, that the central data processing device comprises a linking device, the linking device providing a connection between the user terminal and the central data processing device, between the central data processing device and the service location terminal or between the user terminal and the service location terminal via the said telecommunication network(s), that the central data processing device contains a data base which can be called up from both the user terminal and the service location terminal for recording ordering information and service information respectively and arranged to provide ordering information to the service location terminal and service information to the user terminal, as well as to be continuously updated when an order is recorded, an order is confirmed and when permanent or volatile service information is entered respectively, and that the user terminal is arranged to be connected directly with the service location terminal via the linking device.

Further features and advantages of the method according to the invention are presented in the attached claims 2–10 and further features and advantages of the system according to the invention are presented in the attached independent claims 12–26.

The invention will now be described in more detail in connection with embodiments of the invention and with reference to the attached drawing.

BRIEF DESCRIPTION OF THE DRAWING

FIGS. 3–11 illustrate how information is presented to a user in the system and also gives an example of specification of a service offer in the method according to the invention.

DETAILED DESCRIPTION

Figure 1:
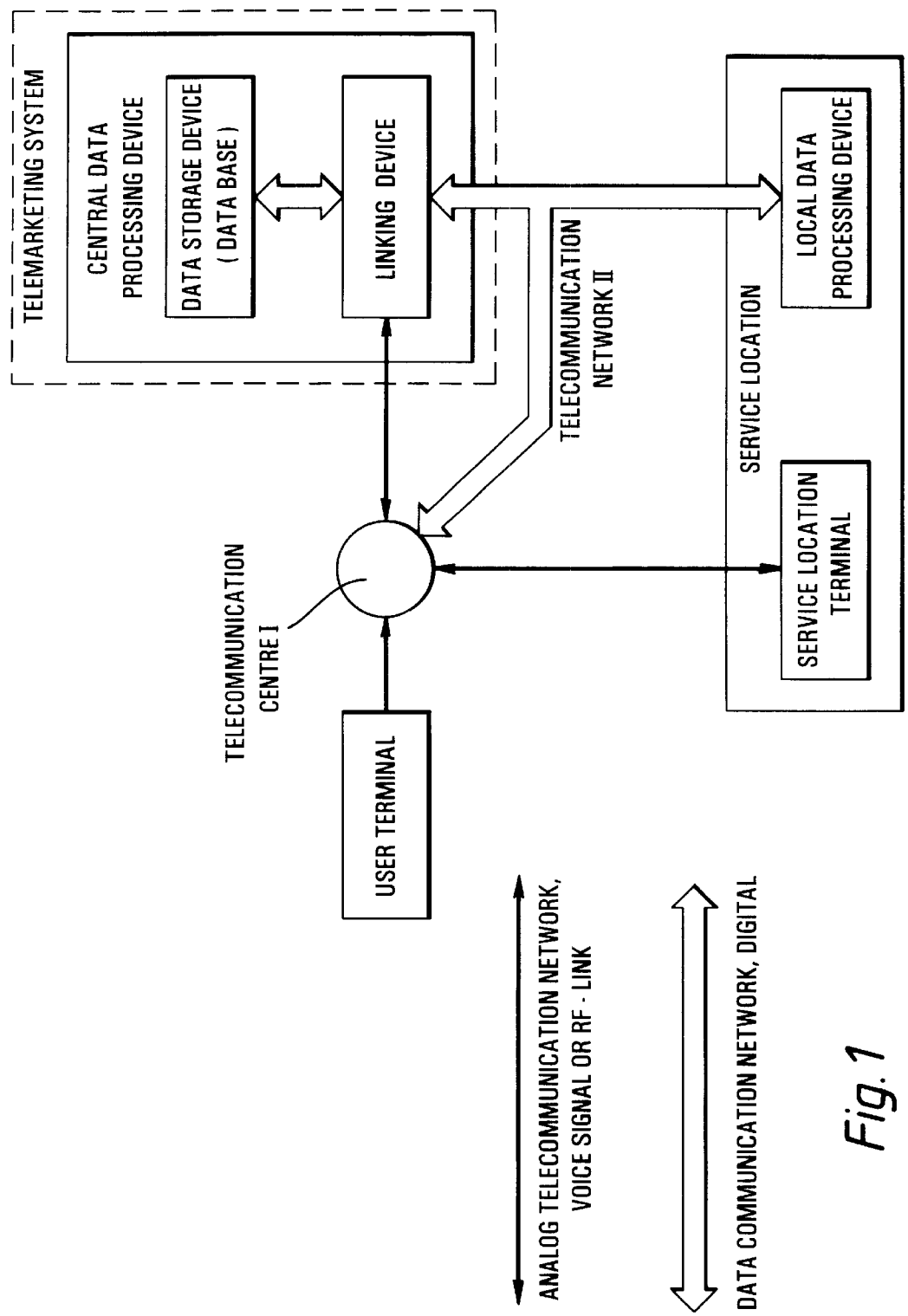
FIG. 1 is a schematic overview of the system according to the invention, represented in the form of a block diagram.

FIG. 1 gives a schematic overview of the system according to the invention. A user terminal, which may be a dedicated terminal or simply a touch-tone telephone, is connected via a telecommunication network, herein called telecommunication network I, to a telecommunication centre, herein called telecommunication centre I. Telecommunication network I can be a publicly accessible telecommunication system. The user terminal is connected via telecommunication centre I with a linking device in a central data processing device. The central data processing device also comprises a data storage device where, e.g., a data base can be stored with service information. The linking device is connected via a further telecommunication network, herein called telecommunication network II, with a local data processing device at a service location. Telecommunication network II can be a data network. The linking device causes a connection to be established between the user terminal and a service location terminal at the service location via telecommunication network I and via telecommunication centre I. Alternatively the connection could also be made via the linking device and telecommunication network II and thus go via the local data processing device which is connected with the service location terminal at the service location. The central data processing device can form part of a telemarketing system as indicated.

As an example of how the method according to the invention is implemented, an account will be given of the process of booking a hotel room. However, it is obvious that other services apart from a hotel room can be ordered by means of the method and the system according to the invention.

Basically, the customer, hereinafter called the user, will perform the booking from a user terminal, which can be a dedicated terminal in the system or an ordinary telephone connected to the public telephone network. The dedicated user terminal may be purely personal and in the form of a small portable computer terminal with display or the like.

Figure 2:
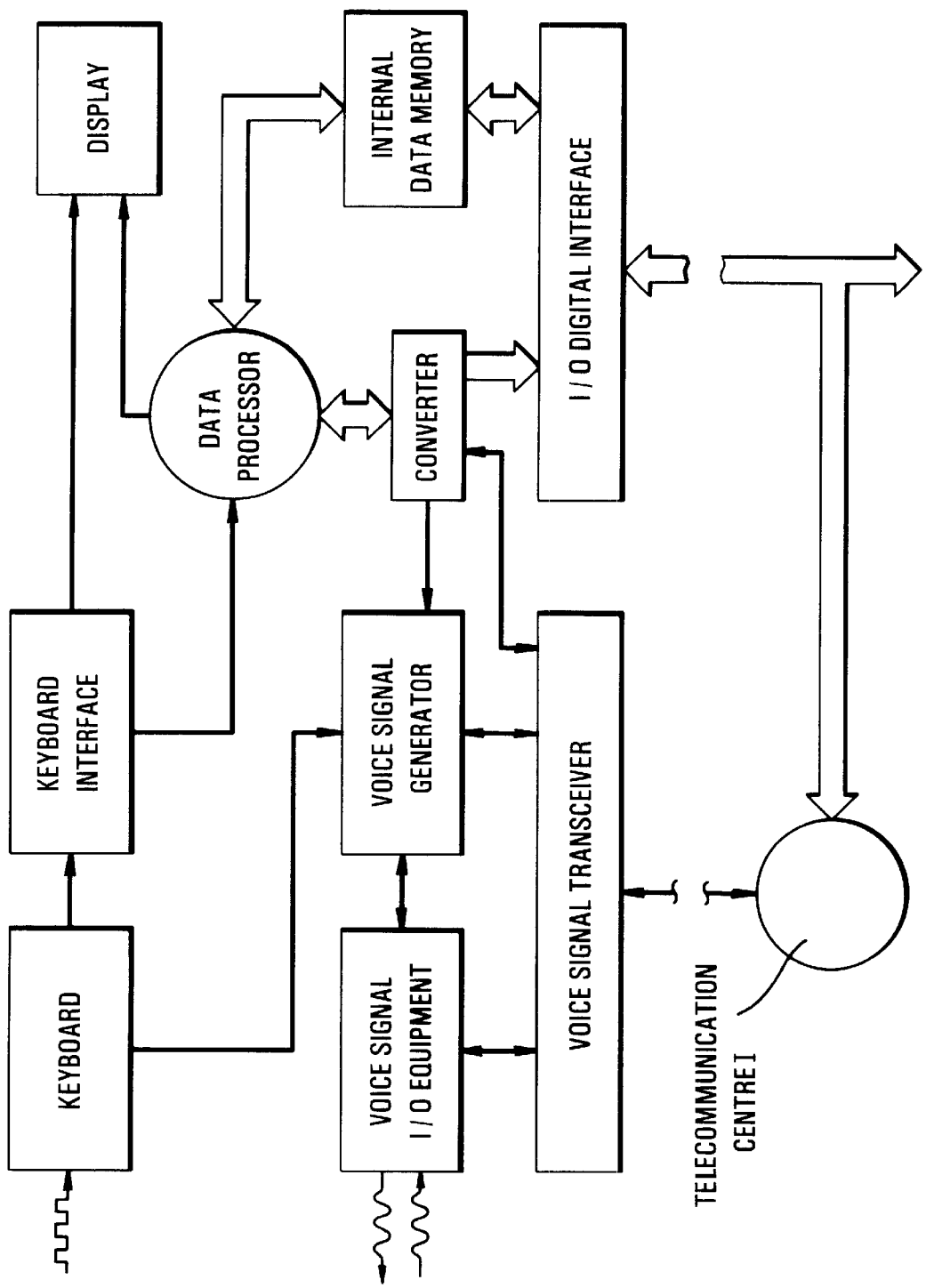
FIG. 2 is a schematic illustration of a dedicated user terminal.

A dedicated user terminal, which can form part of the system according to the invention and is used in the method according to the invention, is illustrated schematically in FIG. 2. The dedicated user terminal is preferably in the form of a hand-held computer or a notebook computer and can be connected to an existing telecommunication network which uses voice frequency signalling or a data network. The dedicated terminal comprises a keyboard which is connected via a keyboard interface with a data processor. The keyboard is also connected to a voice signal generator which generates voice signals which are transmitted to the voice signal-based telecommunication network. Voice signals from the dedicated terminal are transmitted via the telecommunication network and via the telecommunication network's telecommunication centre to a receiver. Incoming signals in the telecommunication network are received in a voice signal receiver which is provided in the dedicated terminal. The voice signal receiver is connected to voice signal equipment, e.g. in the form of a loudspeaker. The voice signal equipment also comprises a microtelephone for voice signal frequency communication from the dedicated terminal via the telecommunication network. A converter connected to the voice signal receiver and the voice signal generator respectively can be connected to the data processor in the dedicated terminal, the data stored or entered in the dedicated terminal being handled by the processor and output via the voice signal-based telecommunication network. The data processor is connected to the keyboard via an internal keyboard interface and also with an internal memory which is connected to a display. Data entered via the keyboard can be displayed via the keyboard interface directly on the screen. The internal memory stores alphanumeric information, for example graphic information in the form of map information for display on the screen. The internal memory may preferably also store a special user programme which is used in the specification of the service requests. The user programme communicates with a user of the terminal via display and keyboard. The data processor is finally connected to an external interface, thus enabling the dedicated terminal to also communicate via a digital data network if this is appropriate. In this manner the dedicated terminal can be connected to the central data processing device or a local data processing device directly via existing digital data communication networks.

In purely practical terms the system according to the invention can be connected to an existing telemarketing system.

When ordering a service, which in this case may, e.g., be hotel booking, the user thus rings up the telemarket from a touch-tone telephone and is connected with a data processing device in the telemarketing system. In this case the data processing device will be connected to a voice network interface which reads out the various offers, and the customer now selects the desired offer by pressing a key. The voice network interface will then continue to read out alternatives according to, for example, geographical and price-associated criteria and the customer's specification of the service offer is performed by pressing a key for the criterion concerned. After the specification criteria have been read out, i.e. the customer has established place, date and price class, the voice network interface will now read out the relevant service offers, i.e. those hotels which have vacant rooms. The customer then selects a specific service offer and enters the code for the desired hotel. The customer has now selected service and the system then effects a direct dialling of the chosen hotel and places the customer in contact with the hotel reception. Thus the user does not need to exit the system in order to get in contact with the hotel. The receptionist in the hotel now reserves the desired hotel room and the reservation is entered in the hotel's local computer which is simultaneously automatically connected with the telemarketing's data base and updates the service offer by recording the current status of the service offer for the hotel concerned. The data base in the telemarketing system will therefore be updated at all times, thus ensuring that other users of the service who select the same service offer can depend on receiving reliable information concerning service offers. Should the hotel at some point land in the situation that it has no vacant rooms during a specific period, this will be entered in the data base and any user who has specified an overnight stay at the place concerned and during the period in question, will then naturally no longer be offered this specific hotel via the system, but instead other hotels which have vacant rooms which fulfil the relevant user-specified criteria for the service.

After the customer has ordered and the booking has been confirmed, the connection between the user and the hotel is disconnected, but the user is still in the system and the contact with the telemarketing's voice network interface is maintained in case the selection of further services is required. If so, communication between user and telemarket will continue in a similar manner. If the user does not require further services, the system is exited by, e.g., pressing a key on the touch-tone phone.

When ordering other types of service, e.g., travel, the user can proceed in a similar manner.

It is particularly easy to implement the method according to the invention when the system comprises a dedicated user terminal, as illustrated in FIG. 2. In principle this user terminal can be personal and as stated in the form of a portable unit and no larger than a hand-held computer or a so-called notebook computer. The dedicated terminal should, however, be capable of being used directly in a voice signal-based telecommunication system, e.g. the public telephone network and will therefore comprise an analog voice signal generator. At the same time it is preferred that a dedicated user terminal should be equipped with a microprocessor, a memory device and a viewing screen display. The dedicated user terminal can receive data via the telecommunication network or the telephone network and be arranged to store alphanumeric and graphic information which can be displayed on the user terminal's viewing screen. The dedicated terminal can also comprise a loudspeaker and possibly a microtelephone for speech communication if a speech-based system such as, e.g., a telemarketing system with a voice network interface is used.

An example will now be presented of an implementation of the method according to the invention using a dedicated, personal user terminal in the system according to the invention.

Figure 4:
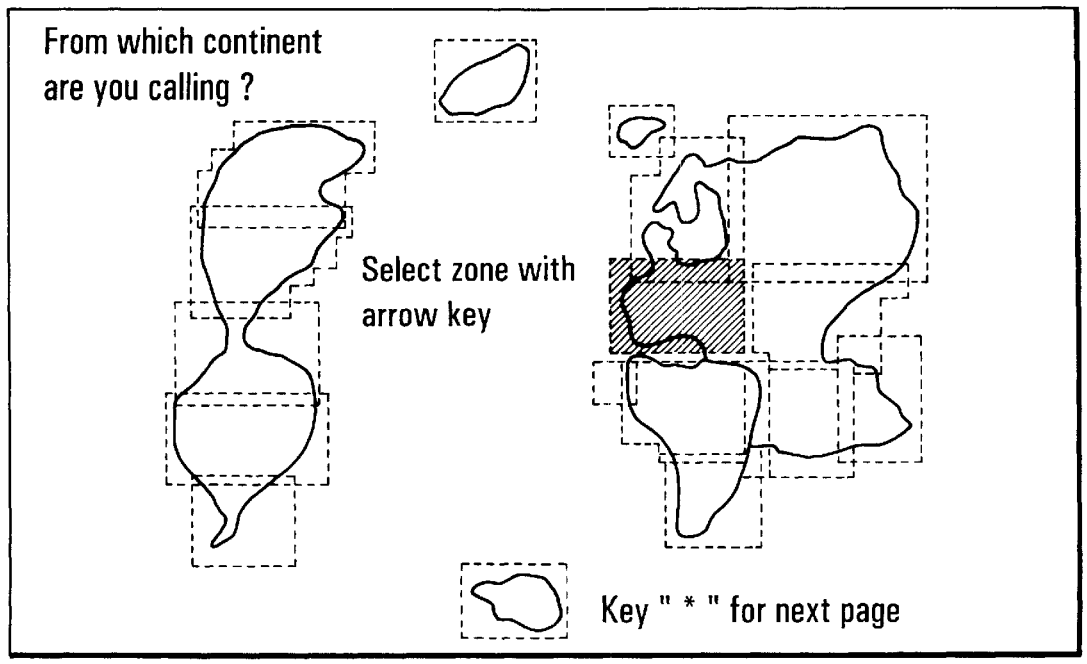
Figure 6:
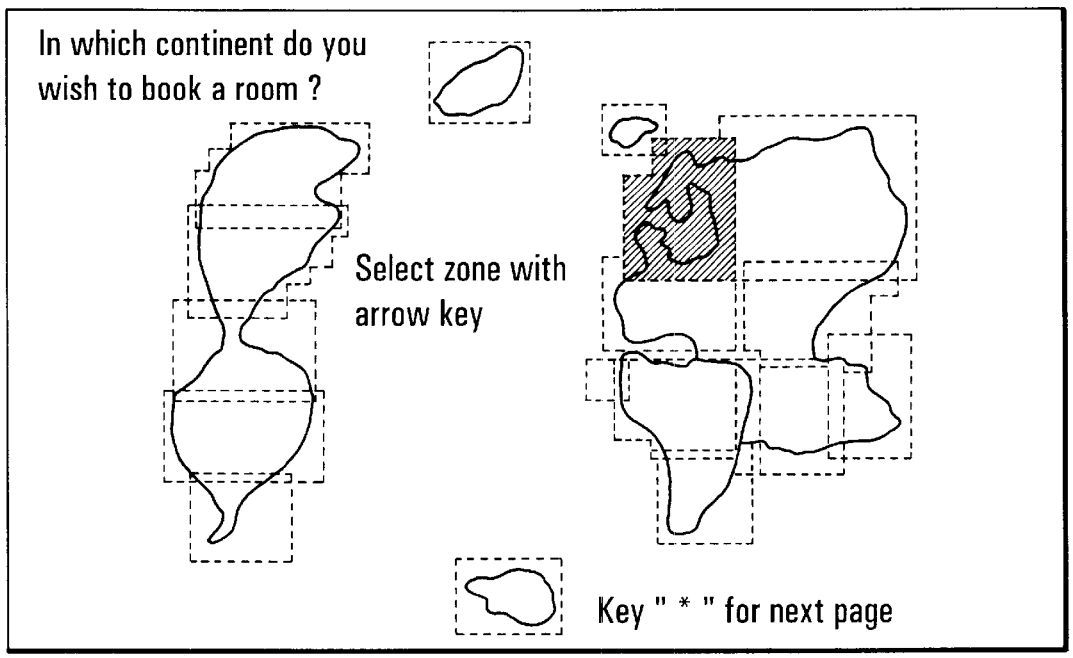

On activation of the user terminal a user programme is retrieved in the terminal's internal memory and information is obtained on the viewing screen as shown in FIG. 3. In this example the system is called "Bellboy Booking Systems" and arranged for booking hotels and travel. The cursor which is shown on the viewing screen can be moved by means of arrow keys on the dedicated terminal and the user can now select the desired service, e.g. hotel room, by placing the cursor on "hotel booking" and pressing a function key. The user now obtains information on the viewing screen in the form of maps as illustrated in FIGS. 4 and 6 and by means of the cursor marks his present location and the service location. New information is retrieved to the user terminal by a single keystroke.

Figure 5:
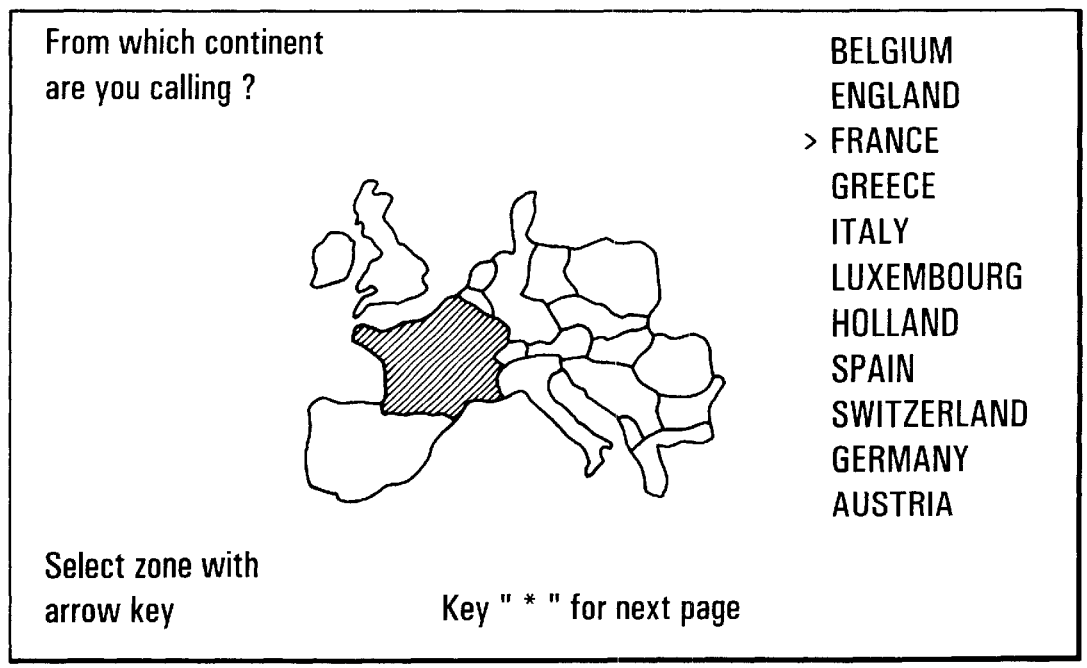

FIG. 5 shows a new information page with more detailed map information for indicating the country from which the call is being made. The country is indicated by moving the cursor, while at the same time the map of the selected country is cross-hatched. When the user has indicated the country, the user terminal finds the telephone number in the central data processing device. This is stored in a separate file which also stores the other information associated with the specification of the service.

FIG. 6 shows a map page for choice of the geographical area in which the service is required.

Figure 7:
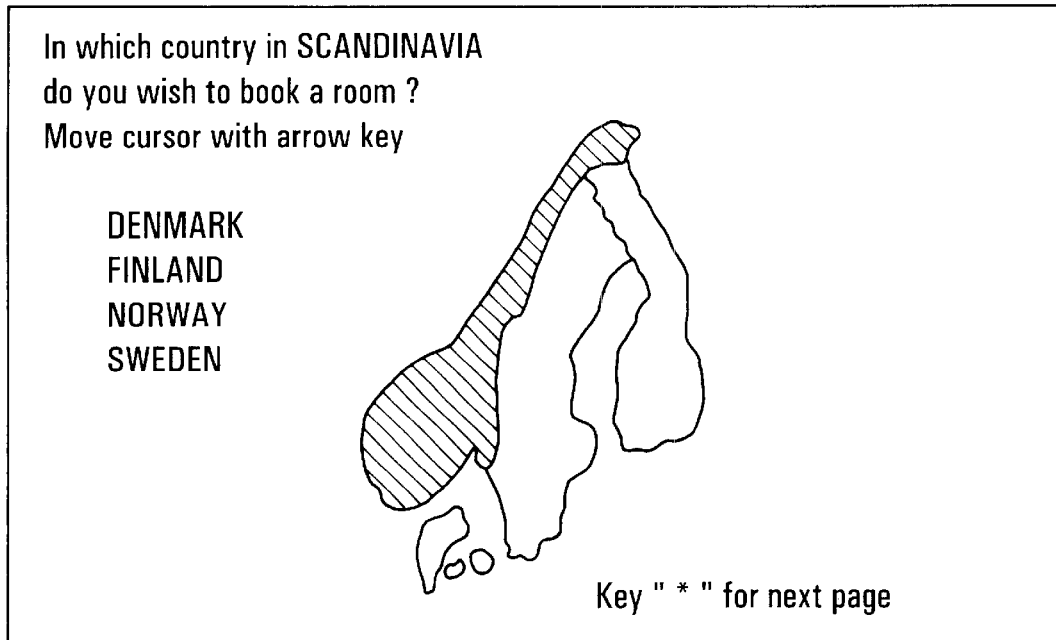
Figure 8:
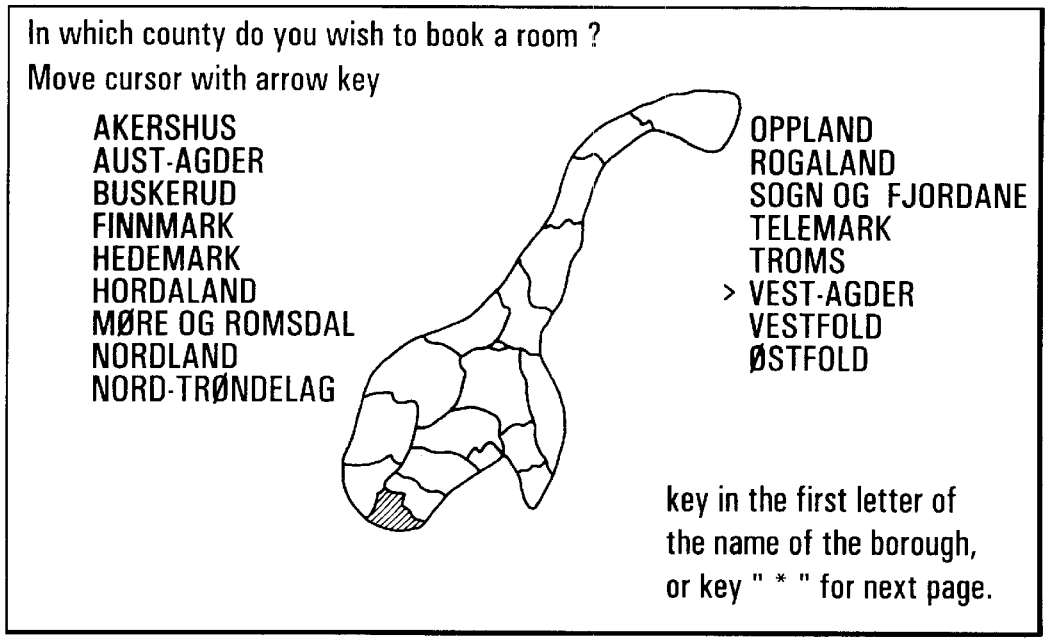
Figure 9:
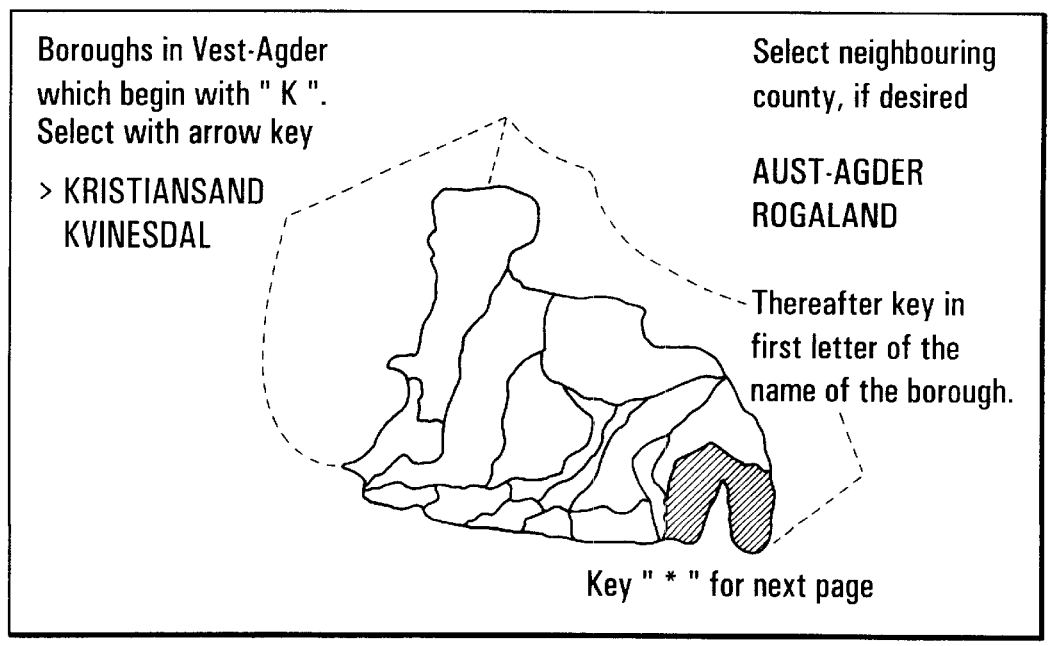

After a geographical area has been selected, the dedicated terminal displays a more detailed map of the area, as illustrated in FIG. 7. The user now selects, e.g., Norway and obtains a new information page where a detailed map is shown of Norway with a list of the individual geographical regions which may be, e.g., counties as illustrated in FIG. 8. After the county has been selected, the dedicated terminal retrieves a detailed county map in which boroughs and towns are marked, as illustrated in FIG. 9, and the user now selects the desired service location indicated by borough name or town name by means of the arrow keys. The map shown in FIG. 10 is simultaneously marked by cross-hatching of the selected area. By means of a keystroke the code is retrieved for the chosen area and the user terminal has now stored the telephone number of the data base or data processing device which contains the required information for specification of a service, together with codes for the choice of abroad, country and district respectively. A new information page on the user terminal's viewing screen is shown in FIG. 10. It contains information which makes it possible for the user to specify the desired service offer by entering time of arrival and departure and also to indicate desired price level for the service. By pressing a key the user can then make a new booking and the user terminal then returns to the information as illustrated in FIG. 2.

All orders are stored in the user terminal's internal memory and when the user has completed the desired orders, a specific key is pressed which causes a call to be made to the relevant central data processing device which, e.g., may form part of a telemarketing system in the country or region concerned. As illustrated in FIG. 11, a new information page is then displayed on the viewing screen, giving the user instructions on how to proceed further. As stated, on the basis of a single keystroke the user terminal will call up the relevant data processing device and the orders which have been entered in the user terminal will now be transferred to the central data processing device. The central data processing device processes the orders in the order in which they are entered by giving the user a list of the relevant service offers. These can be displayed, for example, as alphanumeric information on the viewing screen and the user selects the desired service offer, whereupon the central data processing device automatically establishes the connection with the service location. The connection may be made via the dedicated terminal's keyboard or via a voice network interface in the dedicated terminal, communication thus being made, for example, via the standard telephone network.

Communication between the central data processing device and the user terminal may also be made in the form of voice communication by means of the voice network interface in the user terminal. The system will then act as an ordinary telemarketing service. In every case a service offer is selected and the connection is established with the service location in the same manner as previously. When the order is confirmed, the system proceeds to the next order, while the data base in the central data processing device or the telemarketing system is automatically updated from a local data processing device at the service location, thus ensuring that the data base is updated at all times with correct service information. At the same time the processing of the next order from the central data processing device is initiated and the user proceeds in the same manner as for the processing of the first order. Should only one service specification be undertaken, the central data processing device will ask the user terminal whether more services are required and in this case the user can specify further orders, the information being displayed once again in a layout corresponding to that in FIGS. 2–9. If no further services are required the user exits the system with a keystroke.

There is no reason why the system should not be designed in such a manner that the ordering procedure starts with calling up a central data processing device, e.g. at the user location. The central data processing device can then contain all the information necessary for specification of the order, thus enabling it to be transferred to the user terminal and stored temporarily in the user terminal's memory. However, it is preferred that the user terminal should contain the information necessary for specification of the service offer, the central data processing device only requiring to transfer the actual service information after the service has been specified.

The information on the service offer can, however, also be stored in a second central data processing device and by calling up a first central data processing device and specifying the service, the first central data processing device passes the service specification on to a second central data processing device which then undertakes the same transactions for transferring information to the user terminal and after choice of service establishes the connection to the service location.

In connection with the system according to the invention an interpreting function can be included, thus enabling the user to select the language to be used when the information is displayed on the user terminal's viewing screen. Similarly, the central data processing device will issue information in the desired language from the data base in the central data processing device. The choice of language can be made on the basis of the language used at the service location and the service terminal may also receive information on the language which the user has selected. Hence it will be possible to select the same language at the service location or also a second relevant language which is mastered at the service location, thus enabling the booking information in every case to be displayed in a desired language. Thus the transactions in the system for ordering services can be made in the language required at any time, independent of the user's native tongue or the language used at the service location.

An example will now be presented of how an order is placed from one country to another by means of the system according to the invention and its in-built interpreting function. It is assumed that the user's native tongue is not the language of the country from which the order is made, nor is it the language in the country of the service location. It is assumed that the system is linked to a national or international telemarketing service. The user rings or calls up the national number of the marketing system and feeds in a pre-specified code for the desired language which may be the user's native tongue on a touch-tone telephone which in this case acts as the user terminal. In the system the keystrokes from the user's terminal or touch-tone telephone are interpreted and the language in which the information has to be given is recorded. The telemarketing's voice network interface then issues general information in the chosen language, with information on the price of the service and the possibility of repeating information. The voice network interface then reads out questions in the desired language in order to enable the user to specify the geographical location. The information in the central data processing device's data base is converted to speech in the voice network interface and is read out to the user in the desired language, with specification of a code for selecting a desired alternative. The telemarketing system proceeds in steps which correspond to those used in the dedicated user terminal, apart from the fact that all communication takes place in the form of voice signals and the information is issued as spoken information with codes for the existing alternatives. First of all the continent is selected, then the country, the voice network interface reading out all the countries in the continent with codes and the user can key in the code on his set as soon as the voice network interface has read out the code. When the desired country has been selected, the voice network interface reads out regions in the country concerned, the code for the desired region is keyed in and the programme in the central data processing device continues to the next procedure which is choice of town or borough. These are read out by the voice network interface and the correct code is keyed in. The central data processing device will now provide information via the voice network interface for a more detailed specification of the service with times of arrival and departure. After the message has been read out, the user will be able to key in the specified period by means of the set's keys and the central data processing device returns via the voice network interface to the user with the question whether the specification is correct. If this is confirmed by keying in a special code, the programme continues and the user receives the opportunity of specifying price limits and possibly the quality of the service. If booking of a hotel room is now involved, the central data processing device will provide information via the voice network interface on vacant rooms, price, the situation of hotels in the service location concerned together with the code for the hotel. After keying in the code for the desired hotel, the programme will be able to issue information on the hotel in question, after which the central data processing device in the national telemarketing service will ring the country concerned and establish the connection with the hotel. After establishing the connection the staff at the hotel, e.g. the receptionist, will be placed in direct contact with the user by means of a keystroke and receive his booking, or alternatively, if it is indicated by the information given to the service location terminal, select interpreting via the central data processing device and the voice network interface. If the staff at the user location have selected an interpreting function, the user will receive a message concerning this and whether the communication will take place via the voice network interface. In this case the communication is limited to fixed, pre-selected questions which can be answered by yes or no, again by keystrokes which represent a suitable code. The staff at the service location, e.g. the receptionist at the hotel, can arrive via standard questions at a language which both he and the user can master and choose this, thus again establishing direct connection between user and receptionist. Should user and receptionist have no common language, codes are selected for questions which permit the user to communicate his booking to the hotel via keystrokes, the information received from the user being interpreted in the central data processing device and transferred to the service location, i.e. the receptionist, in his native language or the desired language. The procedure advances until the desired booking information has been received. The booking is recorded in the hotel's local data system while at the same time an automatic connection is established with the central data processing device, thus ensuring that when all the information concerning the reservation has been entered in the local data processing device, the data base in the central data processing device is updated and will at all times be brought up to date with correct information concerning the service offers. After the booking confirmation has been received the user's set will return to the national telemarketing system and new orders can be keyed in.

A person skilled in the art will soon realize that there are a number of different ways whereby the desired information can be coded and entered in such systems. The possibilities will only be limited to what will be expedient depending on whether the set used is a touch-tone telephone or a dedicated terminal.

With the method according to the invention and the system according to the invention it thus becomes possible to perform the ordering of services between different countries, without the problem of language hindering the transactions and the necessary transmission of information.

At the same time the opportunity is provided within the scope of the invention for specifying the desired service by means of information from a permanently stored programme in a dedicated user terminal, if a user terminal of this kind is used for the booking, but alternatively all the necessary ordering information can be supplied from a central data processing device to the user terminal. It will be understood that the user terminal can be linked to a number of data processing devices, both national and international, and form part of a data processing device in a telemarketing system. This telemarketing system can naturally just as easily be located abroad or be an international telemarketing system as a national telemarketing system.

The method and the system according to the invention can, of course, be used for other services than hotel services. Travel bookings will be made in substantially the same way, with specification of criteria based on date, departure point, arrival point and desired method of travel, together with criteria for choice of means of transport, price and quality. The service information can then naturally also include information on possible discounts and the conditions for obtaining such discounts.

One particularly interesting application of the method and the system according to the present invention is apparent in connection with ordering medical services in a national or international market for medical services. In this case if the orders are made within the framework of a public health system, the user terminals can be located in doctor's surgeries and the like and used by a doctor in private practice for ordering consultations with specialists, admissions to hospital and operations, etc.

What is claimed is:

1. A method for ordering services, wherein the ordering is performed via a user terminal connected to at least one central data processing device, wherein the central data processing device comprises a data storage device containing a database of available services and is also connected to a service location terminal, and wherein the method comprises steps of:
   a) calling up the central data processing device from the user terminal,
   b) specifying a service request to the central data processing device,
   c) retrieving from said database in the central data processing device information about current available services corresponding to the service request specified in step b),
   d) selecting a service offer from the available services retrieved in step c),
   e) in response to the selection of a service offer, effecting automatic establishment of a connection between the user terminal and the service location terminal via the central data processing device,
   f) ordering the desired service from the service location terminal,
   g) transferring an order confirmation from the service location terminal to the user terminal,
   h) disconnecting the established connection between the user terminal and the service location terminal when an order confirmation has been transferred to the user terminal,
   i) returning the user terminal to the central data processing device in order either to specify a further service request or to terminate the call,
   j) recording the order of step f) in real time by a local data processing system associated with the service location terminal upon the order being recorded therein, and k) effecting a real time updating of a database in the local data processing system associated with the service location terminal upon the order being recorded therein, and l) updating service information in said database in the central data processing device from the local data processing system associated with the service location terminal on the basis of those transactions undertaken between the user terminal and the service location terminal in connection with the steps a)–g), this update immediately following or being simultaneous with updating of the database in the local data processing system in step k).

2. A method according to claim 1, wherein there is an interpreting function, whereby at each of the steps a)–e) and f),g), the user terminal selects a desired language for the subsequent communication between the user terminal and the central data processing device, or between the user terminal and the service location terminal, independent of the language or languages which are used or can be used at the service location, and wherein in association with step e) or subsequent steps a desired language is selected from the service location terminal for the communication between the service location terminal and the user terminal independent of the language selected from the user terminal, those languages which are used or can be used at the service location in every case being displayed on the user terminal.

3. A method according to claim 1, wherein the specification of the service request in step b) takes place in a dialogue with the central data base device, the service request being specified, amongst other things, on the basis of one or more parameters for time, place, price and quality respectively.

4. A method according to claim 1, wherein the information on the service offer in step c) is retrieved from the user terminal by interactive searching in the data base in the central data processing device.

5. A method according to claim 1, wherein a dedicated terminal with keyboard and audiovisual output devices in the form of a display and a loudspeaker is used as a user terminal, the user terminal comprising an internal memory for storing a user programme which is used for specifying the service request.

6. A method according to claim 5, wherein information for specification of the service request and information on the service offer are displayed at least partially as codes, menus or as graphic information on the display in the dedicated user terminal.

7. A method according to claim 6, wherein the specification of the service request, the retrieval of information on the service offer and the choice of service offer are carried out by means of a cursor controlled by arrow keys provided on the keyboard in order to select a code and/or a symbol in the graphic information and/or from a menu.

8. A method according to claim 1, wherein the central data processing device is linked to a service procurement system in the form of a telemarketing system, communication between the user terminal and the telemarketing system being effected by means of voice frequency signals.

9. A method according to claim 8, characterized in that a dedicated terminal is used as the user terminal communication between the dedicated terminal and the telemarketing system being effected at least partially by means of voice frequency signals.

10. The method of claim 1, wherein said database is a database of available services including service type and time dependent availability of each service.

11. A computer-based system for ordering services, comprising:

a user terminal, at least one central data processing device, said central data processing device comprising a data storage device, network means operatively associated with said user terminal for connecting the user terminal to said central data processing device, at least one service location terminal, wherein said network means is operatively associated with said at least one service location terminal for connecting said service location terminal to said central data processing device, a database in said data storage device is accessed from both said user terminal and from said service location terminal via said network means, said database including fixed and floating information on services and including means for recording information about service offers, and means for searching and retrieving service information from said database from said user terminal and for providing to the user terminal information on a service offer, a linking device associated with said central data processing device, the linking device including means for automatically providing a connection via said network means between said user terminal and the service location terminal for the selected service offer for ordering the selected service from the service location terminal via the thus-established connection and for transferring an order confirmation from the service location terminal to the user terminal, and an updating means associated with said central data processing device for effecting substantial real time updating of service information in said database on the basis of those transactions undertaken between the user terminal and the service location terminal.

12. A system according to claim 11, wherein said network means comprises a telecommunication network and the system forms part of a service procurement system in the telecommunication network, the central data processing device being linked to the service procurement system.

13. A system according to claim 12, wherein the telecomunication network is a public telephone network.

14. A system according to claim 13, wherein the service procurement system is a telemarketing system.

15. A system according to claim 14, wherein the communication from the telemarketing system to the user terminal is effected via a voice network interface linked to the linking device in the central data processing system.

16. The system of claim 11, wherein said database is a database of available services including service type and time dependent availability of each service.

17. A system according to claim 11, wherein the user terminal is a dedicated terminal.

18. A system according to claim 17, wherein said network means comprises a telecommunication network and the dedicated terminal is a portable terminal, the portable terminal comprising an interface for connection to the telecommunication network, a display, a keyboard with arrow keys for moving a cursor on the display and a data processor connected to the interface and arranged for control of the display.

19. A system according to claim 18, wherein the dedicated terminal also comprises an analog voice signal generator connected to the interface for transmitting analog voice frequency signals via the telephone network, together with a loudspeaker for reproduction of speech.

20. A system according to claim 18, wherein the dedicated terminal comprises a non-volatile internal memory connected to the data processor and arranged for storage of alphanumeric and graphic information for viewing on the display, together with a user programme which can be used in communication with a user of the terminal for specification of service request via the terminal's keyboard and display.

21. A system according to claim 20, wherein the graphic information is partially composed of map information.

22. A system according to claim 11, further comprising a data processing device at the service location forming part of a local data processing system.

23. A system according to claim 22, wherein said network means comprises a telecommunication network, and the local data processing system is connected via a modem with the central data processing device via the telecommunication network, the telecommunication network being a data network.

24. A system according to claim 23, wherein the local data processing system constitutes a data base server for the data base in the central data processing device.

25. A system according to claim 24, wherein the local data processing system is arranged to receive and process booking information, as well as to provide a booking confirmation and service information, information being received and provided via the service location terminal from and to the user terminal and the central data processing device.

26. A system according to claim 25, wherein the local data processing system comprises a local data base which is continuously updated in connection with transactions in the local data processing system.

* * * * *